July 29, 1958 J. FRASER 2,845,048
ROTARY LIQUID MOTORS
Filed June 22, 1954 2 Sheets-Sheet 1

JOHN FRASER
INVENTOR

BY
ATTORNEY

July 29, 1958   J. FRASER   2,845,048
ROTARY LIQUID MOTORS
Filed June 22, 1954   2 Sheets-Sheet 2
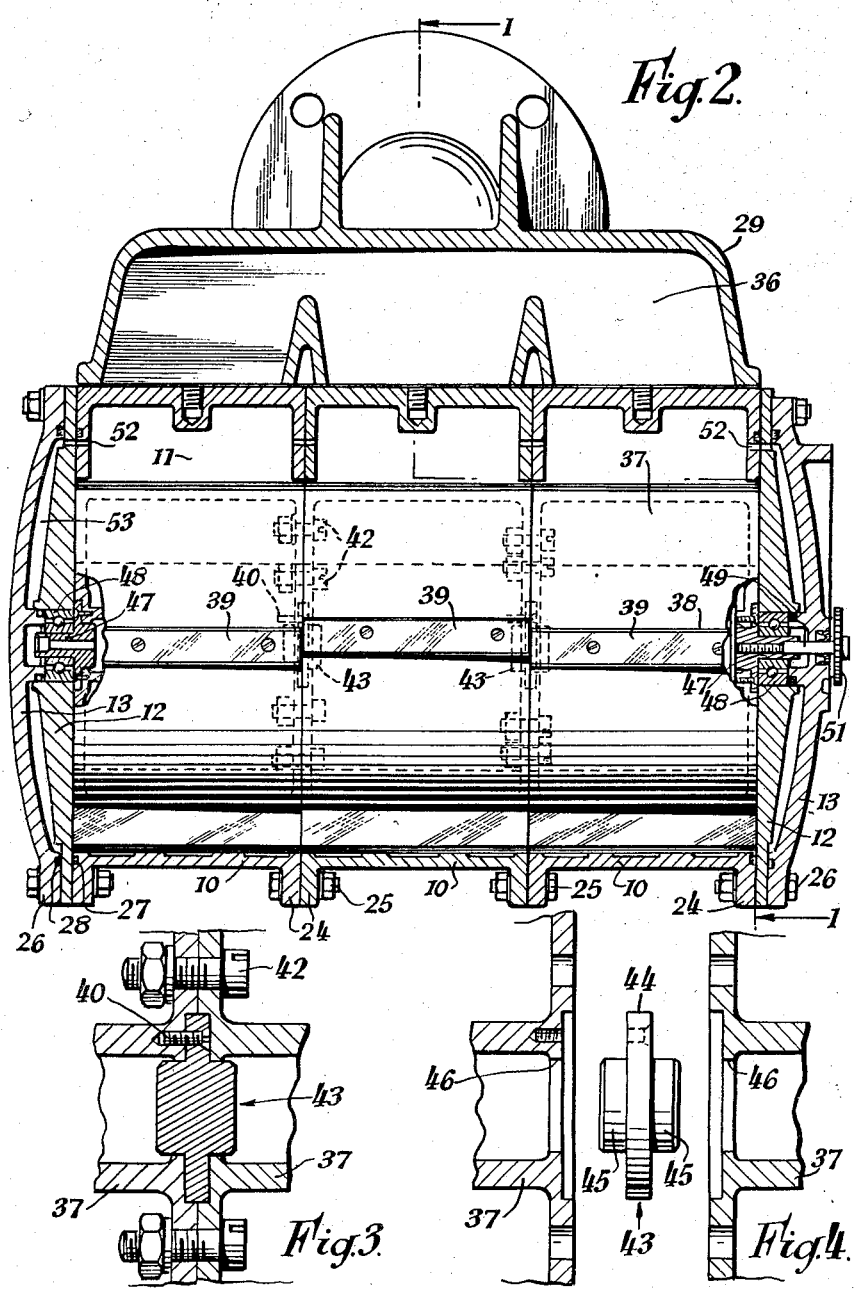
INVENTOR
JOHN FRASER
BY
ATTORNEY United States Patent Office 2,845,048
Patented July 29, 1958

2,845,048

ROTARY LIQUID MOTORS

John Fraser, Tolworth, Surbiton, England, assignor to Avery-Hardoll Limited, Tolworth, Surbiton, England Application June 22, 1954, Serial No. 438,578

Claims priority, application Great Britain July 1, 1953

7 Claims. (Cl. 121—84)

This invention relates to fluid motors for meters of the kind in which a vaned rotor is rotated in a metering chamber by liquid supplied thereto under pressure, the rotor driving, through a shaft, indicating means showing the quantity of liquid passing through the meter.

There is a demand for meters of this type having high capacities, such as, for example, 500 gallons per minute, but the cost of developing a satisfactory meter motor of such a capacity is so high, and the demand for such meters so small, that the production of such a meter motor as an integral unit is quite an uneconomic proposition.

The object of the present invention is to provide a meter motor of the kind referred to, of high capacity, which is economic to produce, is efficient, and is capable of being produced in different capacities with the use of a substantial number of common parts.

According to the invention, a meter motor of the kind referred to comprises a plurality of open-sided casing members each having its inner peripheral wall formed as a vane-guiding surface, the casing members being secured together in side-by-side relation to define a single chamber the ends of which are closed by side plates, and a plurality of vaned rotor members each substantially equal in width to one of the casing members, the rotor members being rigidly secured together to rotate as one in the casing members and being supported by bearings in the side plates.

The meter preferably includes vanes slidable in radial slots in the rotor members, the slots in adjacent rotor members being substantially aligned but preferably angularly displaced to a small extent, so that corresponding vanes of adjacent rotor members overlap one another circumferentially but are located in a sideways direction so that each vane is retained within the width of the rotor member in which it is mounted.

Each casing member may be formed with inlet and outlet ports, a manifold unit secured to the casing units including an inlet passage communicating with all the inlet ports and an outlet passage communicating with all the outlet ports.

Each end rotor member may carry a stub shaft engaging the bearing in the adjacent side plates, and there may be provided at each end of the motor an inner side plate having a flat internal surface and supporting the rotor bearing, and an outer domed side plate, the space between the said side plates being in communication with the working chamber of the meter.

The invention is hereinafter described with reference to the accompanying drawings, in which:

Figure 2 is a longitudinal section of the meter motor taken on the line 2—2 of Figure 1, the rotor being shown mainly in elevation;

Figure 3 is a detail section showing the means for locating the rotor members one relative to another; and Figure 4 is an exploded view of the parts shown in Figure 3.

Figure 1:
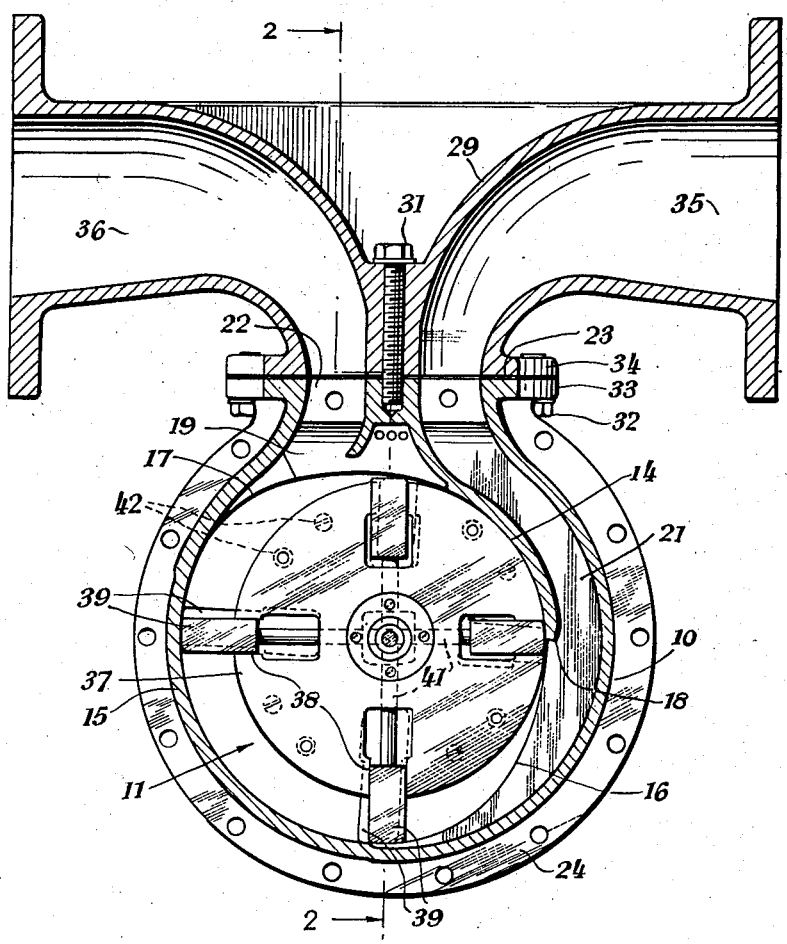
Figure 1 is a cross-section of one form of meter motor according to the invention, the section being taken on the line 1—1 of Figure 2.

Referring to the drawings, the meter motor comprises a number of casing members 10, three being shown in the drawing, the casing members 10 forming a common working chamber 11 closed at its ends by inner side plates 12 having flat internal surfaces and themselves covered by domed outer side plates 13. The working chamber 11 has two opposite wall portions 14 and 15 formed by concentric circular arcs of different radii, each subtending an angle of about 90° at their common centre, and two connecting wall portions 16 and 17 the curvature of which is such that all lines passing through the said common centre and terminating at the chamber walls are of substantially equal length. The wall portions 16 and 17 of each casing member 10 are cut away to provide an inlet port 18 and an outlet port 19, leaving only narrow portions of the walls 16 and 17 at the ends of the member, and passages 21 and 22 lead from the ports 18 and 19 respectively to openings in a flat external surface 23 of the member. Each casing member 10 is provided with an external flange 24 at each end, the middle casing member being secured to the outer casing members by bolts 25 passing through the adjacent flanges, and the side plates 12 and 13 are secured to the end flanges of the outer casing members by bolts 26. Packing rings 27 and 28 located in annular grooves in the members 10 and in the outer side plates 13 respectively ensure fluid-tight joints between those parts and the inner side plates 12. A common manifold unit 29 is bolted to the flat surfaces 23 of the members 10 by three bolts 31 entering tapped holes in the said members and by bolts 32 passing through lugs 33 projecting from the edges of the flat surfaces into tapped holes in corresponding lugs 34 on the manifold unit. The manifold unit 29 has a common inlet passage 35 connected to all the inlet ports 18, and a common outlet passage 36 connected to all the outlet ports 19.

Each casing member 10 has mounted within it a rotor member 37 in the form of a cylindrical drum formed with four radial slots 38 spaced 90° apart, each slot 38 extending for the full width of the rotor member. The rotor members 37 are of slightly less width than the casing members 10 to provide a small degree of end clearance.

In each slot there is slidably mounted a vane 39 having a length equal to the width of the rotor member, the vanes 39 in opposite slots being connected one to the other by rods 41 passing through the centre of the rotor. The rotor slots 38 are closed at their bottoms by walls enclosing a central space in the rotor, and the rods 41 extend through self-aligning packing glands (not shown) preventing the passage of liquid through the holes in the said walls through which the rods pass.

The three rotor members are secured one to another by bolts 42, and are located in accurate alignment one with another by members 43 (Figures 3 and 4). Each member 43 comprises a disc 44 formed with co-axial bosses 45 on its opposite sides, the ends of the rotor members 37 being recessed to receive the disc 44 and each having a hole 46 opening from the recess into the central space in the rotor, which hole is accurately formed to size to receive a boss 45, and is truly concentric with the rotor member. Each member 43 is secured to one of the rotor members 37 between which it is mounted by screws 40 passing through the disc 44 of the said member. Stub shafts 47, located in the end rotor members in the same way as the members 43, are supported in ball bearings 48 in the inner end plates 12, the rotor being mounted so that it is concentric with the arcuate portions 14 and 15 of the working chamber wall. One stub shaft 47 carries a stem 49 passing through a gland in the adjacent end wall 13 of the motor and carrying externally of the end wall a drive element 51 to transmit the rotation of the rotor to meter counting mechanism of any suitable type.

As shown in the drawings, the central rotor member 37 is displaced angularly to a small extent relative to the end rotor members, so that although corresponding vanes 39 on the central and end rotor members overlap circumferentially in all positions, they are slightly displaced one relative to the other in an angular sense, and the parts of the end of each rotor member which overlap the vane slots in the next adjacent rotor member form stops limiting the longitudinal movement of the vanes in said next adjacent rotor member. Thus each individual vane is always retained within the width of the rotor member in which it is mounted, and it is impossible for all the vanes to move towards one end of the working chamber leaving a gap equal to the total of the working clearances of all of them at the other end. Thus adequate working clearance can be allowed for each vane without any risk that the individual clearances can be added together to provide a single gap allowing excessive leakage past the vanes.

The angular offsetting of the vanes 39 causes relative movement between corresponding vanes in adjacent rotor members as the vanes move in and out, such movement tending to displace foreign matter which may enter the clearance between them. Accumulation of foreign matter between the vanes which might produce an endwise thrust and increase the frictional resistance to sliding of the vanes is thus prevented or very substantially reduced.

Small passages 52 in the casing members 10 and the side plates 12 connect the spaces 53 between the inner and outer side plates 12 and 13 to the working chamber 11, adjacent the outlet ports 19, so that there is an inward pressure acting on the inner side plates 12 equal to the pressure at the outlet ports 19, and the side plates 12 cannot be forced outwardly, by pressure in the working chamber, to increase the end clearance of the rotor and disturb the accuracy of the meter. The passages 52 may lead into the working chamber 11 adjacent the inlet ports 18 instead of adjacent the outlet ports.

By assembling two or more units, each comprising a casing member 10 and a rotor member 37, a meter motor can be provided having a capacity which is any desired multiple of the capacity of a single unit, without materially affecting the accuracy of the meter. It will be understood that a suitable manifold unit is provided according to the number of casing members which are included in the meter motor, but all the parts except the manifold unit are common to meter motors comprising one, two, three or any other number of casing members. The manifold unit being separate from the composite body of the meter, stresses in the pipelines are not transmitted directly to the meter body, and thus the risk of distortion of the said body due to such stresses, which might affect the working of the meter, are avoided.

I claim:

1. A fluid motor comprising a plurality of open-sided casing members each having its inner peripheral wall formed as a vane-guiding surface, means to secure said casing members together in side-by-side relation to define a single chamber, side plates closing the ends of said chamber, a plurality of rotor members each substantially equal in width to one of said casing members, substantially radial slots in each of said rotor members the slots in all the rotor members being equally angularly spaced, vanes slidable in said radial slots, means securing said rotor members rigidly together to form a single rotor with the slots in adjacent rotor members angularly spaced to a small extent such that corresponding vanes of adjacent rotor members overlap one another circumferentially but are located axially of the rotor so that each vane is retained within the width of the rotor member in which is it mounted, and means supporting said rotor for rotation in the casing chamber.

2. A fluid motor comprising a plurality of open-sided casing members each having its inner peripheral wall formed as a vane-guiding surface, means securing said casing members together in side-by-side relation to define a single chamber, inner side plates defining the ends of said chamber, outer side plates spaced from said inner side plates and defining fluid-tight chambers external to said inner side plates, passage means connecting said fluid-tight chambers to the casing chamber, a plurality of vaned rotor members each substantially equal in width to one of said casing elements, means securing said rotor members rigidly together in side-by-side relation to provide a single rotor, bearings supported by said inner side plates, stub axle members on said rotor supported in said bearings, and projections on said outer side plates which enter and close the outer ends of the apertures in the inner side plates.

3. A fluid motor comprising a plurality of substantially identical open-sided casing members each having inlet and outlet ports in its periphery and its inner peripheral wall formed as a vane-guiding surface, means securing said casing members together in side-by-side relation to form a single casing, side plates mounted on the free ends of the end casing members and closing the ends of said casing, a plurality of substantially identical rotor members each substantially equal in width to one of the casing members, means securing said rotor members rigidly together in side-by-side relation to form a single rotor, means on said side plates supporting said rotor for rotation in said casing, said casing and rotor defining a single working chamber extending from one side plate to the other, and separate radially-slidable vanes mounted in each said rotor member, said vanes being disposed in rows extending longitudinally of the rotor to form substantially continuous longitudinal partitions in said working chamber.

4. A fluid motor comprising a plurality of substantially identical open-sided casing members each having inlet and outlet ports in its periphery and its inner peripheral wall formed as a vane-guiding surface, means securing said casing members together in side-by-side relation to form a single casing, side plates mounted on the free ends of the end casing members and closing the ends of said casing, a plurality of substantially identical rotor members each substantially equal in width to one of the casing members, means securing said rotor members rigidly together in side-by-side relation to form a single rotor, means on said side plates supporting said rotor for rotation in said casing, said casing and rotor defining a single working chamber extending from one side plate to the other, separate radially-slidable vanes mounted in each said rotor member, said vanes being disposed in rows extending longitudinally of the rotor to form substantially continuous longitudinal partitions in said working chamber, and a manifold unit secured to the periphery of all of said casing units, said manifold unit defining a single inlet passage and a single outlet passage communicating respectively with said inlet and outlet ports in said casing members.

5. A fluid motor comprising a plurality of open-sided casing members each having its inner peripheral wall formed as a vane-guiding surface, means securing said casing members together in side-by-side relation to define a single chamber, inner side plates defining the ends of said chamber, outer side plates spaced from said inner side plates and defining fluid-tight chambers external to said inner side plates, passage means connecting said fluid-tight chambers to the casing chamber, a plurality of vaned rotor members each substantially equal in width to one of said casing elements, means securing said rotor members rigidly together in side-by-side relation with the vanes substantially aligned axially to provide a single rotor with substantially continuous vanes extending the length of said chamber, bearings supported by said inner side plates, stub axle members on said rotor supported in said bearings, and projections on said outer side plates which enter and close the outer ends of the apertures in the inner side plates.

6. A fluid motor comprising a plurality of open-sided casing members each having its inner peripheral wall formed as a vane-guiding surface, means securing said casing members together in side-by-side relation to define a single chamber, side plates closing the ends of said chamber, a plurality of vaned rotor members each substantially equal in width to one of said casing members, means securing said rotor members rigidly together in side-by-side relation with the vanes substantially aligned axially in slightly angularly offset but in circumferentially overlapping relation to provide a single rotor with substantially continuous vanes extending the length of said chamber, and means on said side plates supporting said rotor for rotation in the casing chamber.

7. A fluid motor comprising a plurality of open-sided casing members each having its inner peripheral wall formed as a vane-guiding surface, means securing said casing members together in side-by-side relation to form a single casing, side plates closing the ends of said casing, a plurality of vaned rotor members each substantially equal in width to one of said casing members, means securing said rotor members rigidly together in side-by-side relation with the vanes substantially aligned axially to provide a single rotor with substantially continuous vanes extending the length of said casing, and means on said side plates supporting said rotor for rotation in said casing, said casing and rotor defining a single working chamber extending from one side plate to the other.

References Cited in the file of this patent

UNITED STATES PATENTS

| | | |
|---|---|---|
| 461,533 | Ainsworth | Oct. 20, 1891 |
| 802,843 | Cornelison et al. | Oct. 24, 1905 |
| 1,053,767 | Allan | Feb. 18, 1913 |
| 1,364,014 | Wittig | Dec. 28, 1920 |
| 1,430,929 | Yeatts | Oct. 3, 1922 |
| 1,953,378 | Vias | Apr. 3, 1934 |
| 2,241,132 | Horton | May 6, 1941 |
| 2,465,997 | Boutillon | Apr. 5, 1949 |

FOREIGN PATENTS

| | | |
|---|---|---|
| 136,999 | Switzerland | Mar. 17, 1930 |